United States Patent
Wei et al.

(10) Patent No.: US 8,857,055 B2
(45) Date of Patent: Oct. 14, 2014

(54) PROCESS AND SYSTEM FOR FORMING SHAPED AIR HOLES

(75) Inventors: Bin Wei, Mechanicville, NY (US); Jon Conrad Schaeffer, Simpsonville, SC (US); Ronald Scott Bunker, Niskayuna, NY (US); Wenwu Zhang, Schenectady, NY (US); Kathleen Blanche Morey, Scotia, NY (US); Jane Marie Lipkin, Niskayuna, NY (US); Benjamin Paul Lacy, Greenville, SC (US); Wilbur Douglas Scheidt, Green Township, OH (US)

(73) Assignee: General Electric Company, Niskayuna, NY (US)

( * ) Notice: Subject to any disclaimer, the term of this patent is extended or adjusted under 35 U.S.C. 154(b) by 876 days.

(21) Appl. No.: 12/697,005

(22) Filed: Jan. 29, 2010

(65) Prior Publication Data

US 2011/0185572 A1     Aug. 4, 2011

(51) Int. Cl.
| | |
|---|---|
| B21D 53/78 | (2006.01) |
| B21K 3/04 | (2006.01) |
| B23P 15/02 | (2006.01) |
| F02C 7/18 | (2006.01) |
| F01D 25/12 | (2006.01) |
| B23K 26/38 | (2014.01) |
| B23K 26/06 | (2014.01) |
| B23K 26/30 | (2014.01) |
| B23K 26/08 | (2014.01) |

(52) U.S. Cl.
CPC .............. *F02C 7/18* (2013.01); *F05D 2230/00* (2013.01); *B23K 2201/001* (2013.01); *F01D 25/12* (2013.01); *B23K 26/388* (2013.01); *B23K 26/0635* (2013.01); *B23K 26/422* (2013.01); *F05D 2230/13* (2013.01); *B23K 26/421* (2013.01); *B23K 2201/34* (2013.01); *B23K 26/383* (2013.01); *B23K 26/0807* (2013.01)

USPC ...... 29/889.721; 29/889; 29/889.2; 29/889.7; 29/889.72; 60/754; 219/121.61; 219/121.71; 219/121.78; 219/121.83

(58) Field of Classification Search
USPC ............. 29/889, 889.1, 889.2, 889.7, 889.72, 29/889.721, 402.05, 402.06; 219/121.71, 219/121.78, 121.83, 121.61; 378/41; 60/754, 772
See application file for complete search history.

(56) References Cited

U.S. PATENT DOCUMENTS 5,609,779 A * 3/1997 Crow et al. ............... 219/121.71
6,243,948 B1 * 6/2001 Lee et al. ..................... 29/889.1
(Continued)

FOREIGN PATENT DOCUMENTS

| | | |
|---|---|---|
| CN | 1469792 A | 1/2004 |
| CN | 1863638 A | 11/2006 |
| CN | 101119826 A | 2/2008 |
| EP | 1510283 A1 | 3/2005 |
| GB | 2384734 A | 8/2003 |
| WO | 0249795 A1 | 6/2002 |

OTHER PUBLICATIONS

H.K. Sezer et al., "Twin gas jet-assisted laser drilling through thermal barrier-coated nickel alloy substrates," International Journal of Machine Tools and Manufacture, vol. 49, Issue 14, Nov. 2009, pp. 1126-1135.

(Continued)

*Primary Examiner* — Richard Chang
(74) *Attorney, Agent, or Firm* — Ann M. Agosti

(57) ABSTRACT

A process is provided for forming shaped air holes, such as for use in turbine blades. Aspects of the disclosure relate to forming shaped portions of air holes using a short pulse laser, forming a metered hole corresponding to each shaped portion, and separately finishing the shaped portion using a short-pulse laser. In other embodiments, the order of these operations may be varied, such as to form the shaped portions and to finish the shaped portions using the short-pulse laser prior to forming the corresponding metered holes.

11 Claims, 3 Drawing Sheets

(56) References Cited

U.S. PATENT DOCUMENTS

| | | | |
|---|---|---|---|
| 6,573,474 B1 * | 6/2003 | Loringer | 219/121.71 |
| 6,706,996 B2 | 3/2004 | Wybrow et al. | |
| 6,914,214 B2 | 7/2005 | Byrd et al. | |
| 7,092,484 B1 * | 8/2006 | Jensen et al. | 378/41 |
| 7,329,832 B2 * | 2/2008 | Hoebel et al. | 219/121.71 |
| 8,212,179 B2 | 7/2012 | Luketic et al. | |
| 8,237,082 B2 * | 8/2012 | Beck et al. | 219/121.71 |
| 8,319,146 B2 | 11/2012 | Bunker et al. | |
| 2003/0091432 A1 | 5/2003 | Byrd et al. | |
| 2008/0197120 A1 | 8/2008 | Beck et al. | |
| 2009/0001061 A1 | 1/2009 | Beck et al. | |

OTHER PUBLICATIONS

T. L. VanderWert et al. "Optical Focus Control for Precision Laser Drilling of Aircraft Engine Components," downloaded Jan. 2010 from internet.

T. Beck et al., Cooling air holes and Coatings of Turbine Blades, VDI (Asociation of German Engineers), Report No. 2051, pp. 106-114, 2008.

Unofficial English Translation of Chinese Office Action issued in connection with corresponding CN Application No. 201110037145.5 on Mar. 26, 2014.

* cited by examiner

US 8,857,055 B2

PROCESS AND SYSTEM FOR FORMING SHAPED AIR HOLES

BACKGROUND OF THE INVENTION

The subject matter disclosed herein relates to gas turbines, and more specifically, to a process and system for forming holes in turbine blades.

In general, gas turbines combust a mixture of compressed air and fuel to produce hot combustion gases which flow over, and cause the rotation of, turbine blades attached to a rotor. The hot combustion gases can reach temperatures that exceed the melting point of the turbine blades and other components in the path of the hot gases. To prevent this, the turbine blades and other components in the gas path are typically constructed using high melting alloys and covered with a thermal barrier coating. In addition, the components may include air holes that allow cooler air to pass through or over the components. Upon exiting the holes the cooler air creates a continuous heat shielding layer over the components. This cool air layer acts as a heat shield by limiting the heat transfer from the hot combustion gases to the turbine blade. By limiting the heat transfer from the hot combustion gases the life of the components is increased.

However, the act of forming the air holes may itself cause problems, such as the introduction of cracks, stresses, or irregularities in the thermal barrier coating. Further, the multi-layer construction of the components may present challenges to forming the air holes due to the differing physical properties of the different layers. In addition, the component is typically a contoured shape whose three-dimensional (3D) profile may itself present challenges to forming the air holes.

BRIEF DESCRIPTION OF THE INVENTION

In one embodiment, a method for forming a shaped hole is provided. In accordance with this embodiment, a component is positioned at a first station. A plurality of shaped portions of air holes are formed in the component using a first short-pulse laser controlled by a three-dimensional laser scanner. The component is moved to a second station and a metered hole is formed at each respective shaped portion. The component is moved to a third station or to the first station and the shaped portions are smoothed.

In a further embodiment, a method for forming a shaped hole is provided. In accordance with this embodiment, a plurality of shaped portions of air holes in a turbine blade are formed using a short-pulse laser controlled by a three-dimensional laser scanner. The shaped portions are smoothed using the short-pulse laser controlled by the three-dimensional laser scanner. The short-pulse laser is operated at a different scan rate when smoothing the shaped portions than when forming the shaped portions. The turbine blade is moved to a separate station and a metered hole is formed at each respective shaped portion.

In an additional embodiment, a method for validating a manufacturing process is provided. In accordance with this method, a volumetric representation of all or part of a turbine blade in which one or more air holes have been fully or partially formed is generated. The volumetric representation is compared to a CAD file and a manufacturing process is adjusted based on the comparison of the volumetric representation to the CAD file.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
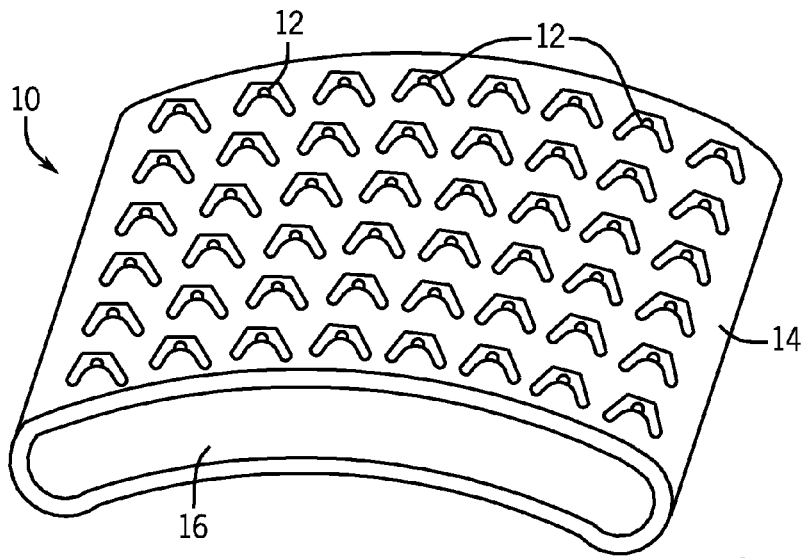
FIG. 1 is an isometric view of a turbine blade including shaped air holes according to one embodiment of the present disclosure.

The present disclosure is directed to a process of creating air holes in turbine blades or any other components that require film cooling. FIG. 1 is an isometric view of an exemplary turbine blade 10 having a three-dimensional (3D) curved surface and including a plurality of shaped air holes 12. These shaped air holes 12 have been drilled into the exterior surface 14 of the turbine blade 10, according to one of the processes that will be described later in the application. The air holes 12 are in fluid contact with the interior cavity 16 of the turbine blade 10. This allows air to flow from the interior cavity 16 through the holes 12 creating a cool air film that covers the turbine blade 10, insulating it from the hot combustion gases generated in a gas turbine engine. Due to their shape relative to the surface of the turbine blade 10, the shaped air holes 12 may help provide a more uniform air flow over the turbine blade 10.

Figure 2:
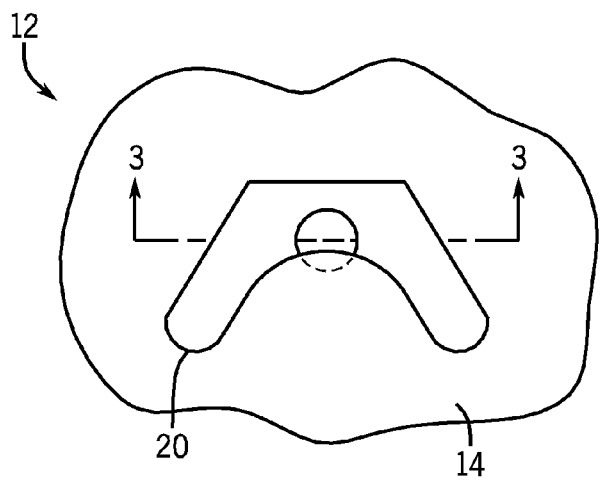
FIG. 2 is a perspective view of a shaped air hole according to one embodiment of the present disclosure.

FIG. 2 is a perspective view of one example of a shaped air hole 12. The shaped air hole 12 has been drilled into an exterior surface 14 of the turbine blade 10. In the depicted embodiment, the hole 12 gradually becomes smaller from the exterior surface 14, as the shaped air hole 12 progresses towards the interior of the turbine blade 10. The surface perimeter 20 of the shaped air hole 12, in this embodiment, is shaped similar to a chevron at the exterior surface 14 of the turbine blade 10. As the shaped air hole 12 progresses towards the interior cavity 16 of the of the turbine blade 10, the cross-section area becomes smaller and, in some instances, more circular. It is contemplated that a variety of holes with different shapes and sizes can be formed using the processes disclosed herein.

Figure 3:
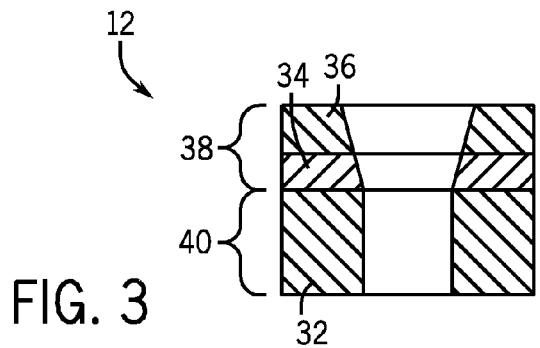
FIG. 3 is a cross sectional view of the shaped air hole of FIG. 2, taken along view line 3, according to one embodiment of the present disclosure.

FIG. 3 is a cross sectional view of an exemplary shaped air hole 12 of a turbine blade 10 taken along view line 3 depicted in FIG. 2. In one embodiment, the turbine blade 10 or specific layers of the turbine blade 10 can be made of any number of materials including metal alloys. For example, in one embodiment the turbine blade 10 consists of a substrate layer 32 that may be constructed from a metal or metal alloy. In one embodiment, the substrate layer 32 is approximately 160 mils in thickness (i.e., approximately 4.064 mm). In the depicted embodiment, the substrate layer 32 is covered by an intermediate layer 34, such as a bond-coat. In this embodiment, on top of the intermediate layer 34 is a thermal barrier coating 36. The thermal barrier coating may be a ceramic coating or another suitable heat coating. In one embodiment, the thermal barrier coating 36 is approximately 40 mils in thickness (i.e., approximately 1.016 mm). The thermal barrier coating 36 and/or substrate layer 32 may bond more strongly with the intermediate layer 34 than they would bond with one another. Thus, the intermediate layer 34 may provide a stronger multi-layer structure in such embodiments. In other embodiments no intermediate layer 34 may exist and the thermal barrier coating 36 may directly contact the substrate layer 32. Furthermore, in other embodiments there may be additional coatings or layers. In addition, other embodiments may not include any thermal barrier coatings or layers.

The shaped (i.e., non-circular) portion 38 of the air hole 12 may be limited to the thermal barrier coating 36 or to the thermal barrier coating 36 and the intermediate layer 34. Alternatively, in other embodiments, the shaped portion 38 of the air hole 12 may extend down into the substrate layer 32. Typically, to the extent the substrate layer 32 (and/or substrate layer 32 and intermediate layer 34) is not pierced by the shaped portion 38, a straight metering hole 40 (having a circular or oval cross section) goes through the substrate layer 32 from the shaped portion 38 of air hole 12 to the inner cavity 16 of the turbine blade 10. In one embodiment, the straight metering hole 40 is drilled at a 30° angle relative to the surface of the turbine blade 10.

Figure 4:
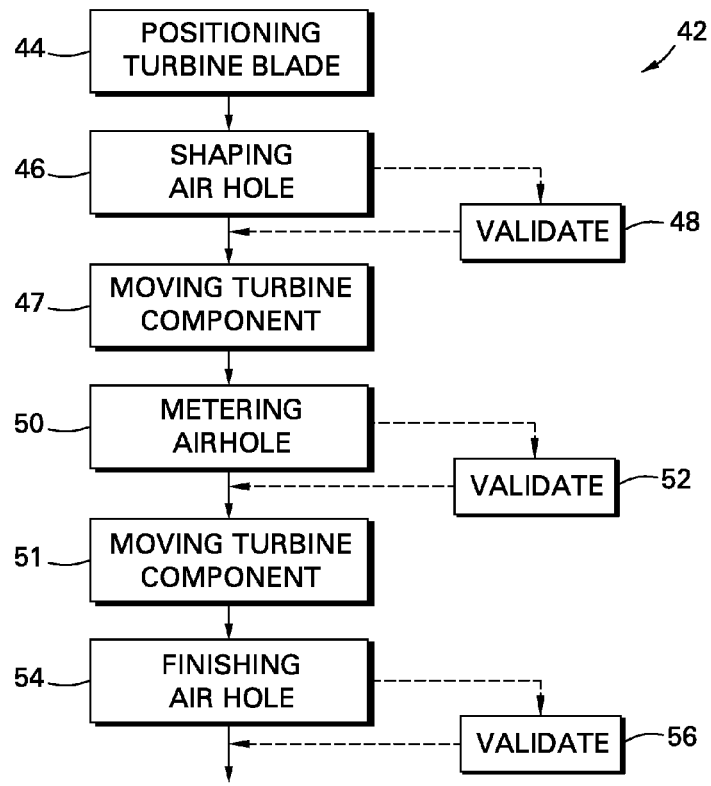
FIG. 4 is a process for creating a shaped air hole in a turbine blade according to one embodiment of the present disclosure.

With the foregoing structure in mind, FIG. 4 is a process 42 for creating a shaped air hole 12 in accordance with one embodiment. A turbine blade 10 is initially positioned (block 44) on a drilling apparatus. The positioning of the turbine blade 10 may be performed manually or automatically. As part of the positioning process, a laser used to form the shaped air holes 12 may be aligned to the three-dimensional geometry of the turbine blade 10.

Once the turbine blade 10 is positioned, the shaped portion 38 of an air hole 12 may be formed (block 46) in the turbine blade 10. In one embodiment, the shaped portion 38 is formed using a short-pulse laser that machines out a portion of the thermal barrier coating 36 in accordance with a specified three-dimensional geometry of the shaped portion 38 of the air hole 12. In some embodiments, the short-pulse laser may also machine out portions of an intermediate layer 34 and/or substrate layer 32 in forming the shaped portion 38 of an air hole 12. Examples of suitable short-pulse lasers may, in one embodiment, have pulse duration less than 10 μs, such as less than 1 μs. In one implementation, femto- and/or pico-second pulse duration lasers may be used to form the shaped portion 38 of the air holes 12. For example, the pulse laser may be a 30 W green laser having pulse durations in the nanosecond range (e.g., less than 25 ns).

In one embodiment, the short-pulse is under the control of a three-dimensional laser scanner with real-time focus control. Such focus control mechanisms may control or adjust the pulse duration, the pulse energy, the overlap ratio, the scanning speed, and so forth, to ensure the geometry accuracy. In one implementation, the scanner controlling the shaping operation is loaded with a CAD file (e.g., a 3D STL CAD file), which is sliced into arbitrary or configurable layers (e.g., 5 μm, 10 μm, 20 μm, etc.). The CAD file is integrated with the laser control such that the scanner controls the short-pulse laser to machine out the desired geometry for the shaped portion 38 of the air hole 12 in accordance with the CAD file. In one such embodiment, a shaped portion 38 that is approximately 3 mm wide and 8 mm long may be formed in approximately 6 minutes. In another embodiment, a shaped portion 38 that is approximately 1 mm wide and 8 mm long may be formed in approximately 1.5 minutes.

In one embodiment, the embedded and tilted shaped portion 38 formed on the curved surface of the turbine blade 10 may be measured and/or assessed for quality purposes using a suitable method. For example, in certain embodiments, one or more of IR imaging, confocal microscope 3D measurement, and/or X-ray radiography may be used to assess the fidelity of the geometry and/or to detect micro-cracks resulting from the shaping process. These processes can be performed with the turbine blade remaining in a drilling fixture or removed from the drilling fixture and performed at another station. For example, in one implementation 3D confocal optical geometry measurements and/or X-ray radiography may be used to measure the shaped portion 38 geometry. Such measurements may then be compared to the measurements specified in a CAD file as a quality control measure. Likewise, IR imaging of the shaped portion 38 may be calibrated with a cross-section analysis to provide rapid, in-line quality monitoring of the shaped portions 38. Such quality control activities may be performed on each shaped portion 38 and/or turbine blade 10 or on a limited number of the shaped portions 38 and/or turbine blades 10 in accordance with a suitable statistical sampling technique.

Figure 5:
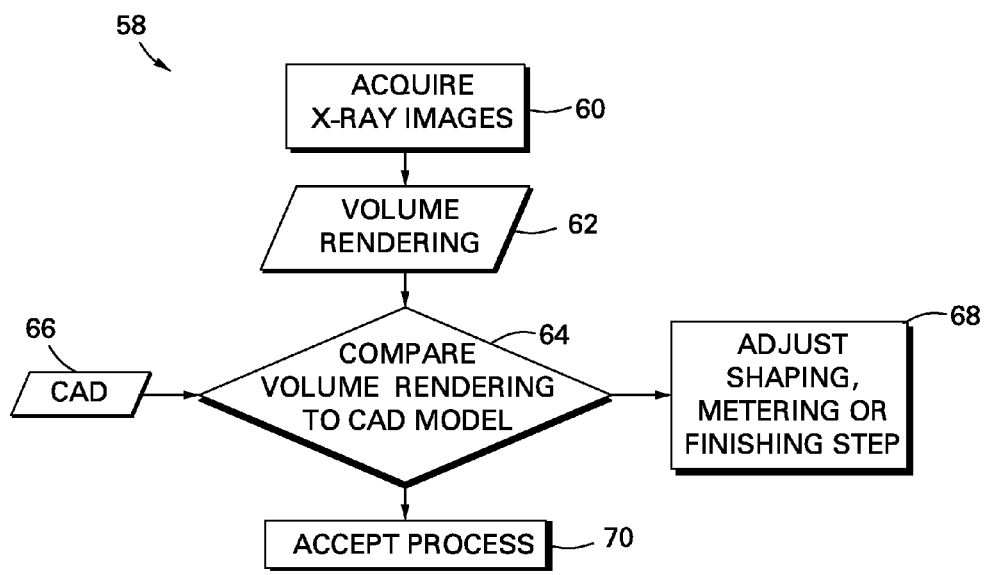
FIG. 5 is a validation process, for a process of creating a shaped air hole in a turbine blade according to one embodiment of the present disclosure.

For example, in one embodiment a global calibration or validation (block 48) may also be performed to periodically (e.g., once a day, twice a day, one a week) assess and/or calibrate the shaping process. One example of such a validation process 58 is depicted in FIG. 5. In one such embodiment, a turbine blade 10 in which the shaped portions 38 have been formed is imaged (block 60) using a volumetric imaging modality, such as a suitable three-dimensional optical or X-ray imaging modality (e.g., a computed tomography (CT) imaging system, a tomosynthesis imaging system, or other volumetric X-ray imaging modalities). In one such embodiment, acquired X-ray projection data or three-dimensional optical measurements are used to reconstruct a volume rendering 62 of the turbine blade 10 for further analysis. The volume rendering 62 may be compared (block 64) to a CAD model 66 (such as a three-dimensional STL CAD file) to determine whether the formed three-dimensional surface features of the turbine blade 10 (e.g., the shaped portions 38) correspond to the specified shapes as represented in the CAD model 66. In one embodiment, a volume rendered image 62 created by the X-ray images and/or the corresponding CAD model 66 can be sliced into layers of configurable thickness (e.g., 5 μm layers, 20 μm layers, and so forth), allowing a detailed, layer-by-layer comparison of the turbine blade 10 (as represented by the volume rendering 62) and the CAD model 66. The detailed inspection can compare the positions, shapes, cross-section, and/or dimensions of the shaped air holes 12 against the CAD model 66 as well as checking for cracks and/or other irregularities that may arise from the formation of the shaped portion 38 of the air holes 12.

If the shaped portions 38 are determined to be improperly placed, shaped, or dimensioned with respect to the CAD model 66, the computers and tools used to form the shaped portions 38 of the air holes 12 are adjusted and/or calibrated (block 68) to address the deficiencies. Such adjustments could include changing the, laser intensity, pulse duration, scan pattern, scan speed, positioning of turbine blade etc. This validation process may be repeated on subsequently formed turbine blades 10 until the imaged shaped portions 38 are determined to be within some specified tolerance of the CAD model, at which point the adjustments are determined to be satisfactory, the validated process parameters may be accepted (block 70)

Returning to FIG. 4, after formation of the shaped portion 38 of the air holes 12, the turbine blade 10 may be moved to a second station (block 47) and then corresponding metering holes 40 may be drilled (block 50) through a region of the substrate layer 32 exposed by each shaped portion 38. In one embodiment, the metering holes 40 are substantially straight, circular holes that go through the some or all of the substrate layer 32 to the interior cavity 16 of the turbine blade 10. The metering holes 40 may be drilled perpendicular to the surface of the turbine blade 10 or at a relative angle, e.g. 30°. In one embodiment, the metering holes 40 are drilled using a high-power, long-pulse laser, such as a laser having a pulse duration between 1 µs to 1 ms and a power rating greater than 50 W (such as between 100 W and 1000 W, with one example being a 500 W laser). In other embodiments, the metering hole 40 may be drilled using other suitable approaches, such as water jets, electrical discharge machining (EDM), electrochemical machining (ECM), percussion trepanning, electron beam machining and so forth. In one implementation, a process other than EDM is used to form the metering hole 40. In embodiments where a different mechanism is used to form the metering hole 40 than was used to form the shaped portion 38, the turbine blade may be moved, automatically or manually, to a different physical station of a manufacturing or assembly line.

As with the shaped portion 38, a measurement and/or quality control process may be performed, such as using pin gauges, to assess the placement, and penetration of the metered holes 40 after formation of the metered holes 40. While some assessment of quality control may be performed for each metered hole 40 and/or turbine blade 10, in other embodiments quality control may be implemented using statistical sampling of a limited population of the metered holes 40 and/or turbine blades 10. Further, as with the shaped portions 30, a validation process (block 52) may be performed periodically (e.g., daily, weekly, and so forth) to validate and/or calibrate the equipment and/or drilling protocols used in the formation of metering holes 40. Such a validation process may assess the placement, angle, penetration, or other characteristics of the metering holes 40 and may be used to adjust or calibrate the equipment and/or drilling process to remain within a specified quality tolerance. Examples of adjustments that may be made based on the validation process include change of the, laser intensity, pulse duration, positioning of turbine blade, scan speed, scan pattern etc.

Though the validation process (block 52) for the metering holes 40 is shown as being separate from the validation process (block 48) for the shaped portions 38, it should be appreciated that in certain embodiments, the validation processes may be performed at the same time and/or in the same manner. For example, the metering holes 40 may be validated using volumetric images 62 generated using three-dimensional optical or radiographic imaging techniques (such as CT or tomosynthesis) and a CAD model 66, either at the same time or separately from the validation of the shaped portions 38. In other embodiments, the validation of the metering holes 40 may be performed using mechanical means, such as pin gauges, that assess the placement and penetration of the metering holes 40.

As depicted in FIG. 4, the turbine blade 10 may be moved to a third station or to the first station (block 51) and then the air holes 12 formed by the shaped portions 38 and metering holes 40 may be fine cleaned or finished (block 54) to apply the desired surface texture, smoothness, and/or surface contour to the air holes 12, such as the shaped portion 38 of the air hole 12, based on the contour provided by the shaping process. For example, the finishing process may remove cracks created when the metering hole 40 is formed. The removal of the cracks improves the integrity of the turbine blade when various stresses are applied during normal operation.

In one embodiment, the finishing may be performed with a short-pulse laser, such as the short pulse laser discussed with respect to forming the shaped portions 38 of the air holes 12. In other embodiments mechanical grinding or EDM may be used for finishing the air hole 12. In embodiments where a short-pulse laser is used to form the shaped portion 38 and to finish the air hole 12 but not to drill the metering hole 40, the turbine blade 10 may be moved, automatically or manually, to a different physical station of a manufacturing or assembly line or to return the turbine blade to a previous station. For example, in one implementation, the turbine blade 10 may be initially processed at a short-pulse laser station to form the shaped portion 38 of air holes 12 then may be moved to a long-pulse laser station for drilling of the metering holes 40 before being returned to the short-pulse laser station for finishing of the air holes 12 using a different processing or scan protocol than was used to form the shaped portions 38.

In one embodiment employing a short-pulse laser, the short-pulse laser may operate at a faster scan rate for the finishing process than was employed to form the shaped portions 38. Likewise, one embodiment the short-pulse laser used in the finishing process may be under the control of a laser scanner with real-time focus control that operates the laser to finish the air hole 12 in accordance with a specified three-dimensional geometry. Such focus control mechanisms may control or adjust the pulse duration, the pulse energy, the overlap ratio, the scanning speed, and so forth, to ensure the geometry accuracy.

In one embodiment, the finished surface of the air hole 12 may be measured and/or assessed for quality purposes using a suitable method. For example, in certain embodiments, one or more of IR imaging, confocal microscope 3D measurement, and/or X-ray radiography may be used to assess the fidelity of the geometry and/or to detect micro-cracks resulting from the shaping process. Such quality control activities may be performed on each air hole 12 or on a limited number of air holes in accordance with a suitable statistical sampling technique.

Further, as with the shaped portions 38 and metering holes 40 discussed above, a validation process (block 56) may be performed periodically (e.g., daily, weekly, and so forth) to validate and/or calibrate the equipment and/or drilling protocols used in the finishing process. Such a validation process may assess the surface, texture, contouring, etc., of the finished air holes 12 and may be used to adjust or calibrate the equipment and/or finishing process to remain within a specified quality tolerance. Examples of adjustments that may be made based on the validation process include change of the laser angle, laser intensity, time laser is used, positioning of turbine blade, etc.

Though the validation process (block 56) for the finishing process is shown as being separate from the validation processes (blocks 48, 52) for the shaped portions 38 and metering holes 40, it should be appreciated that in certain embodiments, the validation processes may be performed at the same time and/or in the same manner. For example, the finished air holes 12 (including the metering holes 40 and shaped portions 38) may be validated in one step using volumetric images 62 generated using three-dimensional optical or radiographic imaging techniques (such as CT or tomosynthesis) and a CAD model 66, as discussed above. Alternatively, all or some of these validation steps may be performed separately and/or without using a comparison to the CAD model 66.

The preceding describes an embodiment in which the shaped portion 38 of an air hole 12 is formed prior to forming the metering hole 40. As noted above, such an embodiment may involve moving the turbine blade to two separate stations (i.e., a short-pulse laser station, a metering station, and back to the short pulse laser station for finishing) or to three separate stations (i.e., a short-pulse laser station, a metering station, and a finishing station which may or may not employ short-pulse lasers). In embodiments where the turbine blade is moved from one station to another, the positioning of the turbine blade may involve hole identification or registration to ensure proper alignment of the device performing the shaping, metering and/or finishing steps.

Figure 6:
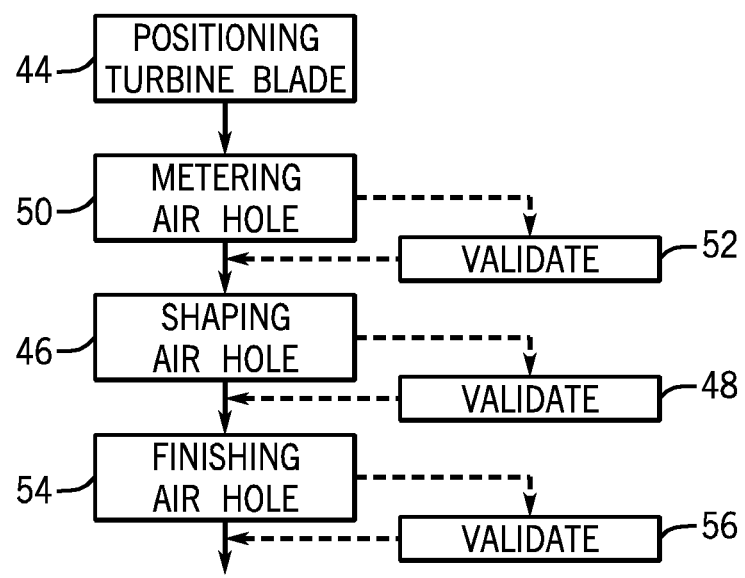
FIG. 6 is another process for creating a shaped air hole in a turbine blade according to one embodiment of the present disclosure.

In other embodiments, the order in which portions of the air hole 12 are formed may be different. For example, referring now to FIG. 6, in one embodiment the various metering, shaping, and finishing process described herein may be performed in a different order in which the metering hole 40 is initially formed (block 50) prior to shaping (block 46) the shaped portion 38 of the air hole 12 and finishing (block 54) the air hole 12. In such an embodiment, the turbine blade may only be moved to two separate stations (i.e., a metering station and a shaping/finishing station), with the shaping and finishing processes occurring at the same station but using different scan protocols (i.e., a shaping scan protocol and a finishing scan protocol).

Further, in another embodiment where a single configurable or tunable laser is used to perform both long-pulse and short-pulse forming operations as discussed herein, the air holes 12 may be formed in a turbine blade 10 at a single physical station, with the operation of the configurable laser suitably adjusted for use in each of the metering, shaping, and/or finishing processes. For example, in one such embodiment, a pulsed laser having a pulse duration of less than 1 ms, suitable wavelength characteristics (e.g., 532 nm, 355 nm, 317 nm, and so forth), and high power (e.g., greater than 100 W) may be employed to shape, meter, and finish the air holes 12. Such a pulsed laser may be under the control of a scanner (such as a CAD driven scanner as discussed herein) or translation stages. In one implementation, the pulsed laser has pulse duration less than 1 ms and has high power and a high repetition rate, such as a high power nanosecond-class Excimer laser or a high power nanosecond-class or picosecond-class green laser.

Technical effects of the invention include the formation of a turbine blade with shaped air holes for the cooling of the turbine blade when in use. The shaped air holes may be formed in a two or three step process, such as by a process where a long-pulse laser is used to form a metering portion of each air hole while a short-pulse laser is used to form a shaped portion of the air hole and to provide a finish (e.g., a fine cleaning) to the air hole. In addition, one technical effect is the use of one or more of IR imaging, confocal microscopy, and/or X-ray radiography in the quality control process. Another technical effect is validation processing using a volumetric representation generated of a turbine blade having formed air holes, where the volumetric representation is compared to a known CAD representation of the turbine blade to verify and/or adjust the manufacturing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for forming shaped holes, comprising:
    forming a plurality of shaped portions of air holes in a turbine component using a first short-pulse laser;
    after forming the plurality of shaped portions, then forming a plurality of metered holes through the turbine component extending from the shaped portions of the air holes to an inner cavity of the turbine component, wherein each metered hole corresponds to one of the plurality of shaped portions of air holes; and
    after forming the plurality of metered holes, then finishing the air holes by smoothing, applying surface textures, and/or applying surface contours to the respective shaped portions.

2. The method of claim 1, wherein finishing the air holes comprises removing cracks.

3. The method of claim 1, further comprising a three dimensional-laser scanner for controlling the first short-pulse laser based on a CAD file provided to the three dimensional-laser scanner.

4. The method of claim 1, wherein first short-pulse laser has a pulse duration less than 10 μs.

5. The method of claim 1, wherein the metered hole is formed using a long-pulse laser, a water jet, an electrical discharge machining system, an electron beam machining or an electrochemical machining system.

6. The method of claim 5, wherein the long-pulse laser has a pulse duration ranging from 1 μs to 1 ms.

7. The method of claim 5, wherein the long-pulse laser has a power rating greater than 50 W.

8. The method of claim 1, wherein forming the plurality of shaped portions comprises forming the plurality of shaped portions in at least a thermal barrier coating layer of the turbine component.

9. The method of claim 1, comprising:
    validating one or more of the shaped portions, the metered holes, or the finished air holes based upon a volumetric reconstruction and a CAD file.

10. The method of claim 1, comprising assessing the finished surface of the shaped portions using one or more of IR imaging, confocal microscopy, or X-ray radiography.

11. The method of claim 1, wherein finishing the air holes comprising using a second short-pulse laser operated at a different scan rate than the first short-pulse laser.

* * * * *